United States Patent
Marakis

(10) Patent No.: US 7,069,713 B2
(45) Date of Patent: Jul. 4, 2006

(54) HARVESTER OF OLIVES

(76) Inventor: Nikolaos Marakis, 10 M. Odigitrias Str., GR-71201 Heraklion (GR)

( * ) Notice: Subject to any disclaimer, the term of this patent is extended or adjusted under 35 U.S.C. 154(b) by 34 days.

(21) Appl. No.: 10/499,845

(22) PCT Filed: Feb. 19, 2002

(86) PCT No.: PCT/GR02/00009

§ 371 (c)(1),
(2), (4) Date: Jun. 23, 2004

(87) PCT Pub. No.: WO02/065826

PCT Pub. Date: Aug. 29, 2002

(65) Prior Publication Data

US 2005/0268589 A1    Dec. 8, 2005

(30) Foreign Application Priority Data

Feb. 20, 2001   (GR)  ............................. 20010100095

(51) Int. Cl.
*A01D 46/00* (2006.01)
(52) U.S. Cl. ....................................................... 56/330
(58) Field of Classification Search ............... 56/328.1, 56/329, 330, 340.1, 331
See application file for complete search history.

(56) References Cited

U.S. PATENT DOCUMENTS

| 3,483,687 | A | * | 12/1969 | Tanner Jr. ................... 56/328.1 |
| 3,827,221 | A | * | 8/1974 | Chen .......................... 56/328.1 |
| 4,395,867 | A | * | 8/1983 | Cooper et al. ............. 56/327.1 |
| 5,946,896 | A |   | 9/1999 | Daniels |
| 6,425,233 | B1 | * | 7/2002 | Hosking ..................... 56/328.1 |

* cited by examiner

*Primary Examiner*—Árpád Fábián Kovács

(57) ABSTRACT

The collection of the olives is performed by a machinery, that has attached a telescopic rod (A.a), fixed from one side, and free to rotate hydraulically form the other side. This free side moves mechanically by the operator in order to come as close as possible to the olives. The strikers who drop the olives off the tree are on the free side of the rod. The machinery is either pulled and gets its power/motion through a compler by a tractor or it is as an independent automotive self-driven piece of machinery. The olives fall into a PVC foil top (A.b), which mechanically extends under the tree. The olives are transferred over a rotating belt (A.c) into the selected sacks, as the leaves have already been separated from the olives with the help of the absorber (A.d).

7 Claims, 3 Drawing Sheets

HARVESTER OF OLIVES

FIELD OF THE INVENTION

The invention relates to the technical field of agricultural machinery, especially of machinery employed in the harvesting of olives from olive trees.

BACKGROUND OF THE INVENTION

In the related art of machinery employed in the harvesting of olives or other fruits various devices are disclosed which involve employment of striker means for effecting the downfall of the olives or other fruit from the trees. However such striker means often results to hurting of the fruit and/or does not manage to implement a thorough collection thereof. Moreover such striker means are often not associated in a single compact machinery with proper collection means employed in gathering the fruit immediately as they fall from the tree and they further do not make any provision for mechanically separating the harvested olives from leaves and for eventually packaging the harvested olives.

SUMMARY OF THE INVENTION

The invention proposes a compact olive harvesting machine that may perform harvesting of olives by employing a telescopically deployed first rod with striker means comprising a second rod pivotally mounted at the outermost end thereof, a plurality of evenly spaced third rods rotatably mounted perpendicularly along and on either side of said second rod and an arrangement of plastic strikers being disposed in a crosslike pattern perimetrically around each one of said plurality of evenly spaced third rods, wherein the abovementioned second rod of the striker means moves in a manner such as to simulate the movement of the human hand thereby effecting thorough harvesting without hurting the olives. The compact olive harvesting machine further comprises in combination a telescopically deployed olive collection means that leads the harvested olives through a rotating belt with absorber means for separating olives from leaves, the olives thereby being led into packaging sacks.

BRIEF DESCRIPTION OF THE DRAWINGS

The invention will be made apparent to those skilled in the art by reference to the accompanying drawings in which.

DETAILED DESCRIPTION OF THE INVENTION

Figure 1:
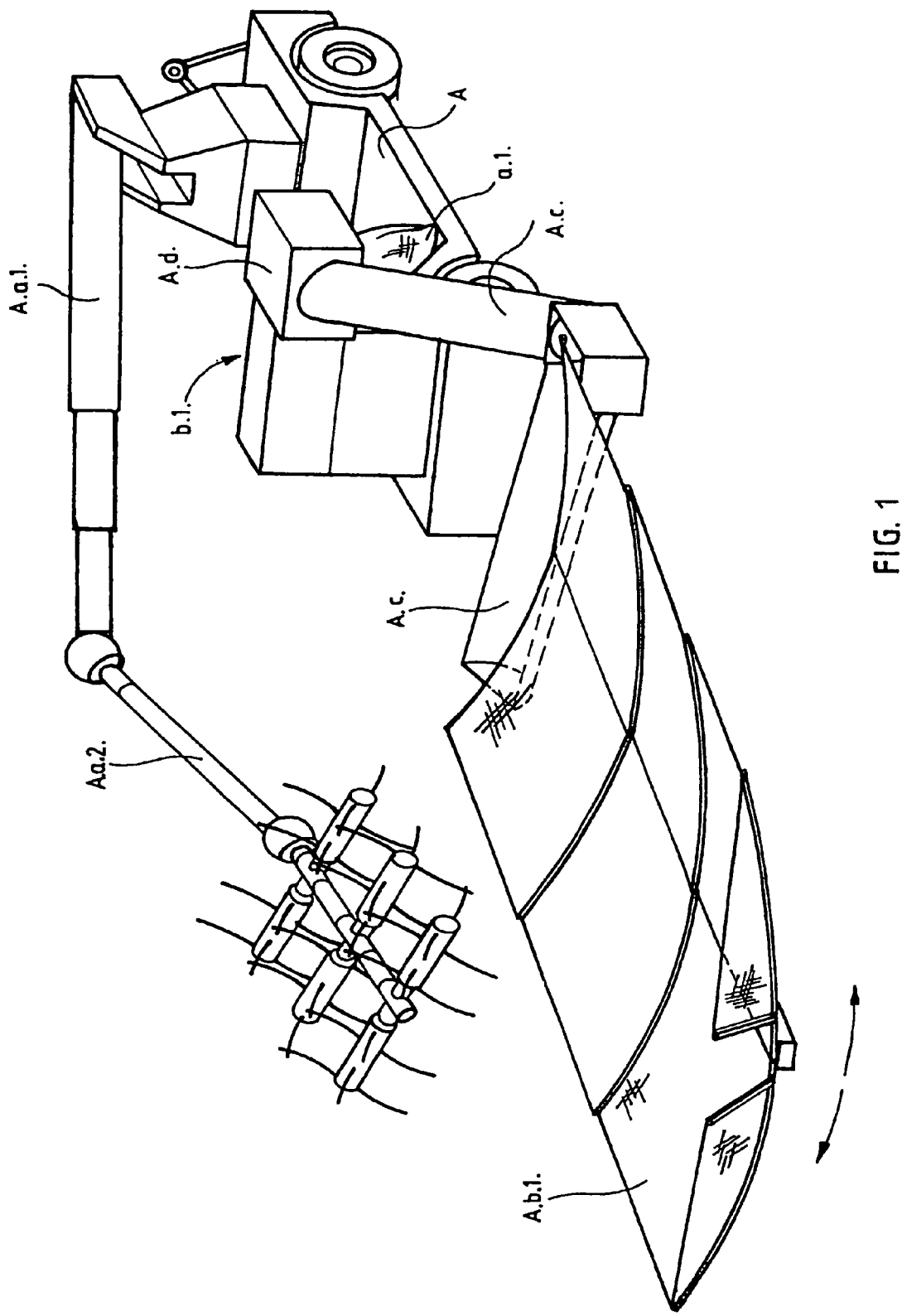
FIG. 1 shows a perspective view of the olive harvesting machine of the invention comprising the telescopically deployed striker and collection means and further the means for separation of olives from leaves and for eventually packaging thereof.

As shown in FIG. 1, the olive harvesting machine proposed in the present invention comprises a block A mounted onto wheels capable of moving in selected locations in the proximity of an olive tree. A telescopic first rod A.a.1 is pivotally mounted onto block A and from there it may be expanded at a height suitable for reaching any desired location of the olive tree to be harvested.

Figure 2:
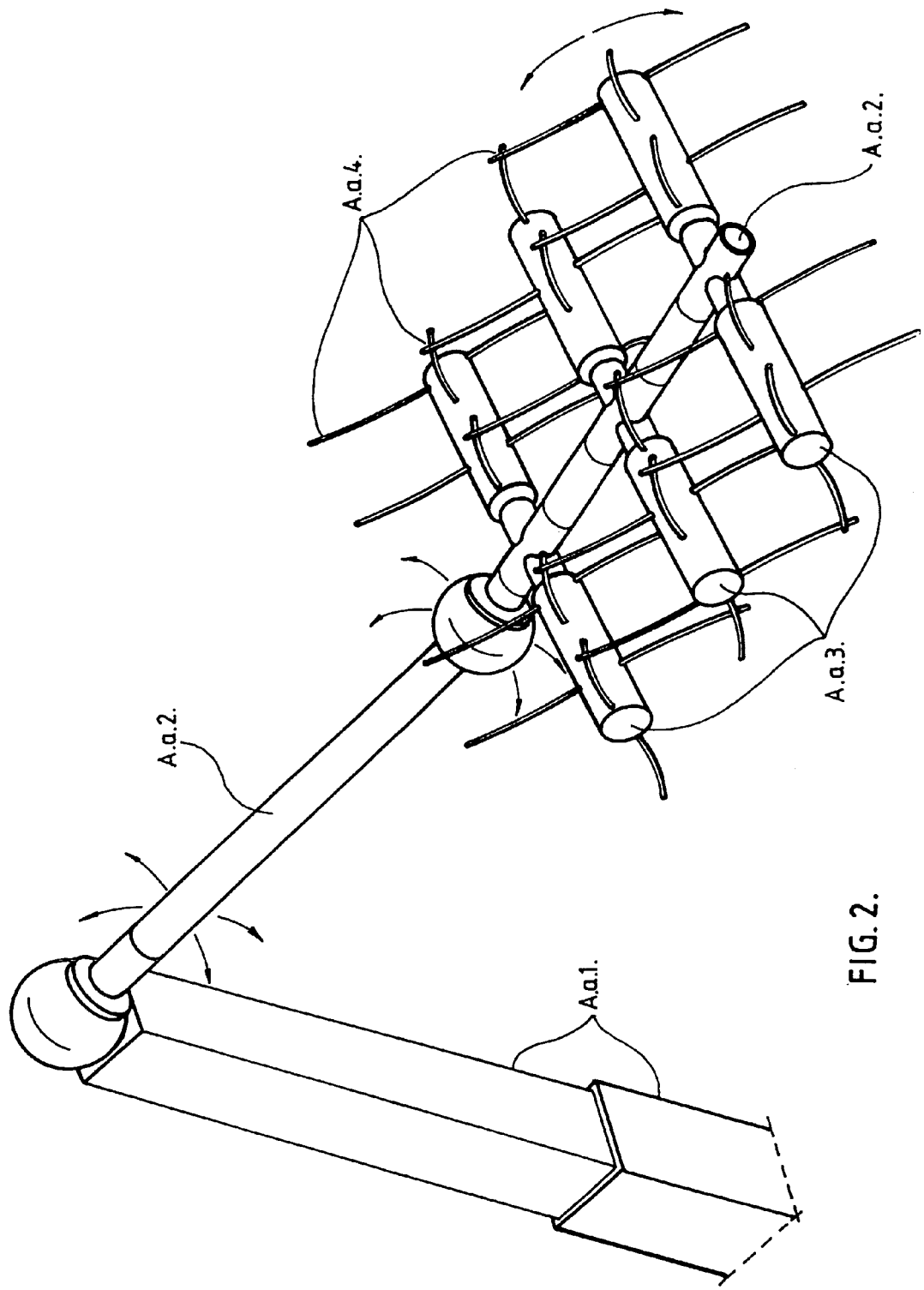
FIG. 2 shows a detail of the striker means employed in the olive harvesting machine of FIG. 1.

A striker means as depicted in detail in FIG. 2 comprises a second rod A.a.2 pivotally mounted at the outermost end of the telescopic first rod A.a.1 and a plurality of evenly spaced third rods A.a.3 rotatably mounted perpendicularly along and on either side of the second rod A.a.2. Each one of the plurality of evenly spaced third rods A.a.3 comprises an arrangement of plastic strikers A.a.4 being disposed in a crosslike pattern perimetrically around the same. Means for driving movable items and especially for moving the plurality of evenly spaced third rods A.a.3 via a central motion transmission means activating a simultaneous rotation of all such evenly spaced third rods A.a.3 is provided onto the same block A.

Figure 3:
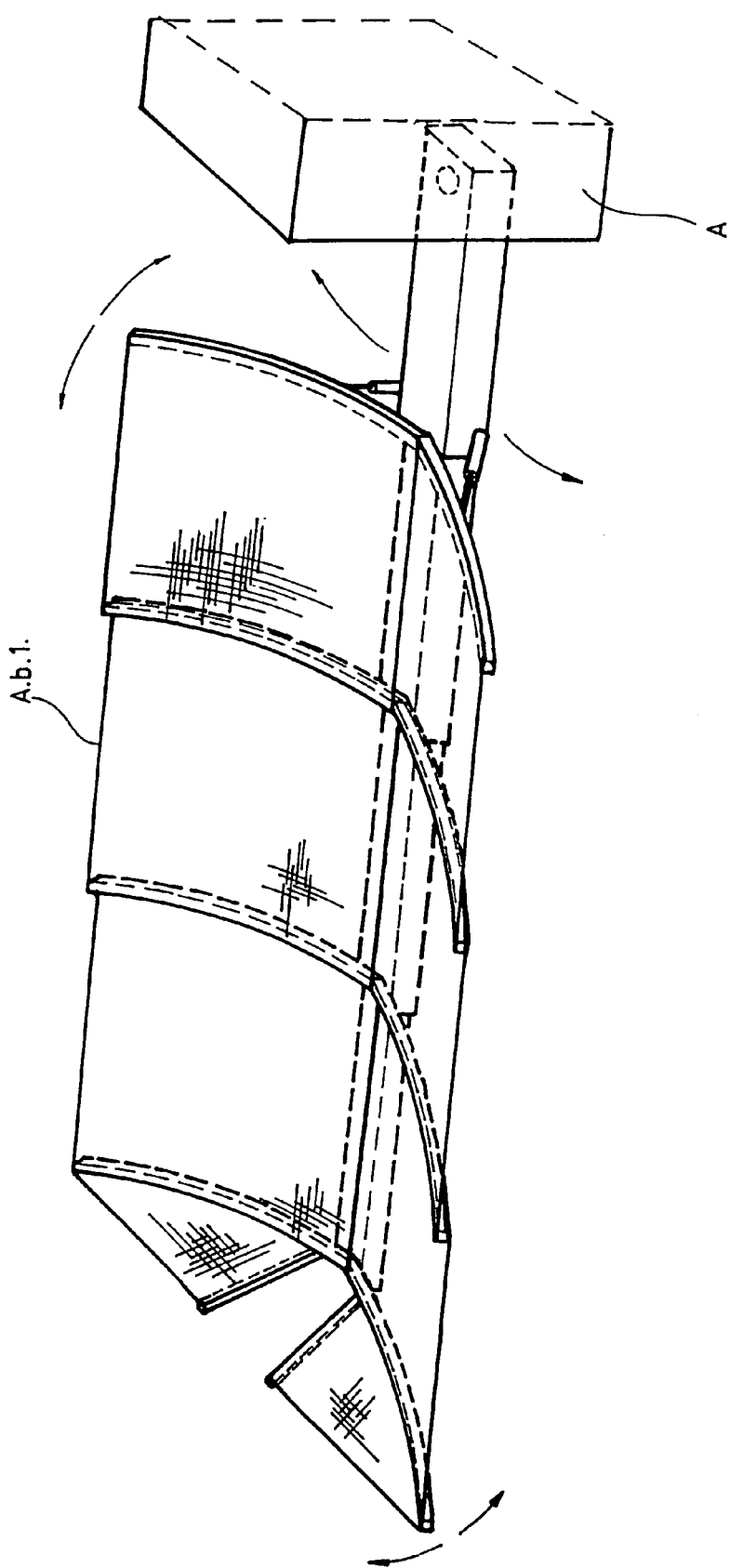
FIG. 3 shows a detail of the telescopically deployed collection means employed in the olive harvesting machine of FIG. 1.

The means for the collection of olives falling from the olive tree through striking action of the plastic strikers A.a.4 as depicted in detail in FIG. 3 is located at the other side of block A, opposite to that of the deployment of the telescopic first rod A.a.1. This means for the collection of olives is deployed at a selected location underneath the olive tree to be harvested prior to initiating striking action thereof and comprises an assembly of a plurality of olive collection foil portions A.b.1 of parallelogram configuration and a telescopically extendable fourth rod that passes centrally through this plurality of olive collection foil portions A.b.1 and supports the same. The telescopically extendable fourth rod is pivotally mounted preferably at the rear side of block A and is capable of turning at an arc of 90° rightwards or 90° leftwards and of longitudinally extending to reach a selected position underneath the olive tree where olives are expected to fall through striking action of the plastic strikers A.a.4. An aperture is provided at a discharge end of the assembly of olive collection foil portions A.b.1 and as each foil portion of the assembly of olive collection foil portions A.b.1 preferably comprises inclined side walls, an inclined orientation of the overall assembly is obtained thereby leading collected olives to pass through the abovementioned aperture. In accordance with a preferred embodiment of the invention an innermost foil portion of the assembly of olive collection foil portions A.b.1 is fixedly mounted onto the telescopically extendable fourth rod passing centrally therethrough, whilst the other foils of the plurality of foil portions is selectively foldable within the innermost fixedly mounted foil portion as the telescopically extendable fourth rod contracts when the means for the collection of olives is not in use and are deployed when the telescopically extendable fourth rod expands to bring the means for the collection of olives at a selected location underneath the olive tree.

A rotating belt A.c is adapted to receive the olives being discharged through the aperture and an absorber A.d is provided at a certain point along the rotating belt A.c for separating olives from leaves, whereby olives deprived from leaves are eventually led into an arrangement of packaging sacks a.1, b.1 mounted onto the same block A, wherein olives are alternatively led into packaging sack a.1 or packaging sack b.1 to attain a continuous operation of the olive harvesting machine as discharge of olives is being shifted from one packaging sack after filling thereof into the other. In accordance with a preferred embodiment of the invention the pivoting of the abovementioned second rod A.a.2 at the outermost end of the telescopic first rod A.a.1 is such as to allow this second rod A.a.2 to selectively move in any orientation up-down, right-left with respect to the telescopic first rod A.a.1 thereby achieving a motion in simulation of the human hand.

According to a preferred embodiment the means for driving movable items of the olive harvesting machine and specifically for moving a) the plurality of evenly spaced simultaneously rotatable third rods A.a.3 of the striker means, b) the rotating belt A.c, c) the telescopic first rod A.a.1 bearing the striker means and d) the telescopically extendable fourth rod supporting the assembly of olive collection foil portions A.b.1 is a hydraulic circuitry comprising an oil pump mounted onto block A and connected through oil circulation piping to the abovementioned movable items of the olive harvesting machine. The olive harvesting machine of the invention may be attached to and pulled by a tractor or related vehicle and in this case the power supply for operating the abovementioned hydraulic circuitry is received from this tractor or related vehicle. Alternatively, the olive harvesting machine can be offered as automotive machinery equipped with a driving seat and being provided with an autonomous power supply for operating the same abovementioned hydraulic circuitry and for driving.

The employment of the olive harvesting machine of the invention specifies a novel method for the collection of olives that following bringing the olive harvesting machine in the proximity of an olive tree, comprises the steps of deployment of the telescopic first rod bearing the striker means and of the telescopically extendable fourth rod of the collection means and successively performing the striking action of the olives through selective continuous human hand simulating movement of the striker means, the olives being thereby automatically led through the rotating belt equipped with the absorber for effecting separation of olives from leaves into the eventual automatic packaging process of consecutively filling packaging sack a.1 or b.1. A characteristic feature of the invention is that all abovementioned steps are implemented by the operator through operations carried out through a console.

The invention claimed is:

1. Olive harvesting machine for the collection of olives through striking an olive tree at selected locations thereof to effect downfall of olives and subsequently separating olives from leaves, characterized by that it comprises in combination:
   a block (A) mounted onto wheels capable of moving in selected locations in the proximity of an olive tree;
   a telescopic first rod (A.a.1) pivotally mounted onto said block and expandable at a selected location of the olive tree;
   striker means comprising a second rod (A.a.2) pivotally mounted at the outermost end of said telescopic first rod (A.a.1), a plurality of evenly spaced third rods (A.a.3) rotatably mounted perpendicularly along and on either side of said second rod (A.a.2), an arrangement of plastic strikers (A.a.4) being disposed in a crosslike pattern perimetrically around each one of said plurality of evenly spaced third rods (A.a.3);
   means for driving movable items and especially for moving said plurality of evenly spaced third rods (A.a.3) via a central motion transmission means for activating a simultaneous rotation of all rods in said plurality of evenly spaced third rods (A.a.3);
   means for the collection of olives falling from the olive tree through striking action of said plastic strikers (A.a.4), said means for the collection of olives being deployed at a selected location underneath said olive tree and comprising an assembly of a plurality of olive collection foil portions (A.b.1) of parallelogram configuration, a telescopically extendable fourth rod passing centrally through said plurality of olive collection foil portions and supporting the same, said telescopically extendable fourth rod being pivotally mounted at a rear side of said block (A) capable of turning at an arc of 90° rightwards or 90° leftwards and of longitudinally extending to reach a selected position underneath the olive tree where olives are expected to fall through striking action of said plastic strikers (A.a.4), an aperture being provided at a discharge end of said assembly of a plurality of olive collection foil portions (A.b.1), each foil portion of said assembly of a plurality of olive collection foil portions (A.b.1) comprising inclined side walls so as to obtain an inclined orientation of the overall assembly to lead collected olives to pass through said aperture, a rotating belt (A.c) being adapted to receive the olives being discharged through said aperture, an absorber (A.d) being provided at a certain point along said rotating belt (A.c) for separating olives from leaves, whereby olives deprived from leaves are alternatively led into packaging sack (a.1) or packaging sack (b.1), said packaging sacks (a.1, b.1) being mounted onto said block (A).

2. Olive harvesting machine as claimed in above claim 1, characterized by said second rod (A.a.2) pivotally mounted at the outermost end of said telescopic first rod (A.a.1) being capable of selectively moving in any orientation up-down, right-left with respect to said telescopic first rod (A.a.1) thereby achieving a motion in simulation of the human hand.

3. Olive harvesting machine as claimed in above claim 1, characterized by that an innermost foil portion of said assembly of a plurality of olive collection foil portions (A.b.1) is fixedly mounted onto said telescopically extendable fourth rod passing centrally therethrough, whilst the other foils of said plurality of foil portions being selectively foldable within said innermost fixedly mounted foil portion as said telescopically extendable fourth rod contracts whilst said means for the collection of olives is not in use and are deployed as said telescopically extendable fourth rod expands to bring said means for the collection of olives at a selected location underneath said olive tree.

4. Olive harvesting machine as claimed in above claim 1, wherein said means for driving movable items and specifically for moving said plurality of evenly spaced simultaneously rotatable third rods (A.a.3) of said striker means, said rotating belt (A.c), said telescopic first rod (A.a.1) bearing the striker means and said telescopically extendable fourth rod supporting said assembly of olive collection foil portions (A.b.1) is a hydraulic circuitry comprising an oil pump mounted onto said block (A) connected through oil circulation piping to said movable items of said olive harvesting machine.

5. Olive harvesting machine as claimed in above claim 4, wherein the machine is attached to and pulled by a tractor or related vehicle and the power supply for operating said hydraulic circuitry is received from said tractor or related vehicle.

6. Olive harvesting machine as claimed in above claim 4, wherein the machine is an automotive machinery equipped with a driving seat and being provided with an autonomous power supply for operating said hydraulic circuitry and for driving.

7. Method for the collection of olives employing an olive harvesting machine being characterized by that following bringing said olive harvesting machine in the proximity of an olive tree, it comprises the following steps being implemented by the operator through operations carried out through a console:

appropriately turning and deploying a telescopic first rod (A.a.1) of said olive harvesting machine to bring striker means comprising a second rod (A.a.2) pivotally mounted at the outermost end of said telescopic first rod (A.a.1) and a plurality of evenly spaced third rods (A.a.3) rotatably mounted perpendicularly along and on either side of said second rod (A.a.2) and an arrangement of plastic strikers (A.a.4) being disposed in a crosslike pattern perimetrically around each one of said plurality of evenly spaced third rods (A.a.3) at a selected location of the olive tree;

appropriately turning and deploying a telescopically extendable fourth rod of said olive harvesting machine said fourth rod supporting an assembly of olive collection foil portions (A.b.1) to bring said olive collection foil portions at the desired position underneath the olive tree wherein olives are expected to fall through striking action of said striker means;

performing a selective continuous human hand simulating movement of said second rod (A.a.2) pivotally mounted at the outermost end of said telescopic first rod (A.a.1) thereby effecting an efficient striking action in the olive collection process as said second rod (A.a.2) selectively continuously moves in any orientation, up-down, right-left with respect to said telescopic first rod (A.a.1), wherein olives and leaves being separated from the olive tree through said striking action fall downwards into said assembly of olive collection foil portions (A.b.1);

operating an absorber means (A.d) of said olive harvesting machine to effect separation of olives from leaves along a rotating belt (A.c.) wherein olives are discharged from said assembly of olive collection foils (A.b.1);

alternatively guiding discharge of olives from said rotating belt (A.c) into packaging sack (a.1) or packaging sack (b.1) of said olive harvesting machine to attain a continuous operation of the olive harvesting machine as discharge is being shifted from one packaging sack after filling thereof to the other;

repeating the above sequential steps with sequential movement of the olive harvesting machine at adjacent locations of the same or of an adjacent olive tree.

* * * * *